(12) United States Patent
Parkinson et al.

(10) Patent No.: US 7,885,146 B2
(45) Date of Patent: Feb. 8, 2011

(54) ADJUSTABLE COUNT DOWN TIMER

(75) Inventors: Alan Parkinson, Sandy, UT (US);
Pamela Parkinson, Sandy, UT (US);
Katie Cochran, Bountiful, UT (US)

(73) Assignee: Potty Time, Inc., Sandy, UT (US)

( * ) Notice: Subject to any disclaimer, the term of this patent is extended or adjusted under 35 U.S.C. 154(b) by 69 days.

(21) Appl. No.: 11/511,899

(22) Filed: Aug. 28, 2006

(65) Prior Publication Data

US 2007/0047392 A1    Mar. 1, 2007

Related U.S. Application Data

(60) Provisional application No. 60/713,188, filed on Aug. 31, 2005.

(51) Int. Cl.
*G04F 10/00* (2006.01)
*G04B 47/00* (2006.01)

(52) U.S. Cl. .................. 368/109; 368/10; 340/309.4

(58) Field of Classification Search ............ 368/10, 368/109
See application file for complete search history.

(56) References Cited

U.S. PATENT DOCUMENTS

| | | | |
|---|---|---|---|
| 4,026,101 A * | 5/1977 | Moyer | 368/83 |
| 4,451,158 A * | 5/1984 | Selwyn et al. | 368/63 |
| 5,016,230 A | 5/1991 | Selfers | |
| 5,365,496 A * | 11/1994 | Tolan-Samilow | 368/109 |
| 5,691,932 A * | 11/1997 | Reiner et al. | 368/10 |
| 6,144,619 A * | 11/2000 | Reisman | 368/10 |
| 6,674,364 B1 * | 1/2004 | Holbrook et al. | 340/568.1 |
| 2002/0009018 A1* | 1/2002 | Patella | 368/108 |
| 2003/0123330 A1* | 7/2003 | Carter et al. | 368/109 |
| 2003/0231554 A1 | 12/2003 | Fox et al. | |

FOREIGN PATENT DOCUMENTS

DE    19956173 A1    5/2001

OTHER PUBLICATIONS

International Search Report for PCT/US2006/034019 (second sheet), mailed May 14, 2007.
Package insert and instructions for VibraLite3 watch.

\* cited by examiner

*Primary Examiner*—Felix O Figueroa
(74) *Attorney, Agent, or Firm*—F. Chad Copier

(57) ABSTRACT

A timer device includes a timer housing. An electronic countdown circuit is disposed within the timer housing. The electronic countdown circuit is programmed to include at least one mode of operation. A display device is attached to the timer housing and in electronic communication with the electronic countdown circuit. The display device includes an LCD display and at least one flashable LED light. A power source is in electrical communication with the electronic circuit. At least one switch is in electrical communication with the electronic countdown circuit. The switch is adapted to select the mode of countdown operation.

18 Claims, 3 Drawing Sheets

ADJUSTABLE COUNT DOWN TIMER

CROSS-REFERENCE TO RELATED APPLICATIONS

This application is a continuation of U.S. Provisional Patent Application No. 60/713,188 filed on Aug. 31, 2005, which is incorporated herein in its entirety and to which priority is claimed.

BACKGROUND OF THE INVENTION

1. Field of the Invention

This invention relates to a timer device. More specifically, this invention relates to a timer device that is used to remind a user about repetitive tasks.

2. Description of Related Art

A variety of devices have been developed to help users remember repetitive tasks. Some of these devices include clocks or timers, such as watches designed to help aircraft pilots perform timed turns, time of lengths of exercise periods in circuit training, and other devices for tracking the number of responses during a timed examination. However, typically such devices do not include an automatic restart to the timer without additional input from a user, nor do these devices typically include lights and music to communicate to a young child.

One example is found in U.S. Pat. No. 6,144,619, which describes a pilot watch that includes countdown timers for preprogrammed events (specifically related to piloting an aircraft). The watch, however, provides many other features that would possibly confuse a user interested in timing simple repetitive tasks. U.S. Pat. No. 5,684,758 describes a countdown timer that is designed to assist with disciplinary "time outs" for small children. The timer does not provide countdown intervals which are long enough for repetitive tasks that require more than 10 minuets between timed events. In another example, U.S. Pat. No. 6,072,384 describes a countdown timer designed to eliminate nocturnal bedwetting with an alarm that can only be deactivated by the person wearing the alarm. The person takes a magnetic ring to a restroom where the magnetic ring will deactivate the alarm. The timer does not provide for a portable alarm that can be worn by the user during the day. Also, the timer does not provide any audio and visual alarms to help notify the user during regularly scheduled intervals.

In a further example, U.S. Pat. No. 5,365,496 describes a potty training device which is controlled by an "event switch" which must be use to choose between two alternative timing circuits and to reset the timer between timed "events." This device, however, does not provide for an automatically resetting countdown timer which does not require input from the user to restart the countdown sequence. And the complex nature of the circuitry required for performing the functions as described in the '496 Patent would make this device difficult to produce and confusing to operate. Some of the functions described in the '496 Patent, especially in the alternative embodiments which refer to an information library of recorded stories and animated characters to read them, make it difficult to produce in a compact size that can be worn by a young child.

SUMMARY OF THE INVENTION

A timer device includes a timer housing. An electronic countdown circuit is disposed within the timer housing. The electronic countdown circuit is programmed to include at least one mode of operation. A display device is attached to the timer housing and in electronic communication with the electronic countdown circuit. The display device includes an LCD display and at least one LED light that is capable of flashing. A power source is in electrical communication with the electronic circuit. At least one switch is in electrical communication with the electronic countdown circuit. The at least one switch is adapted to select the mode of countdown operation.

In another aspect of the invention, a method of selecting a mode of operation in a timer device includes the steps of providing the timer device with an electronic countdown circuit and at least one switch in electrical communication with the electronic countdown circuit. The electronic countdown circuit is programmed with a time interval in a selected countdown mode. Next, a selection switch signal is received from the at least one switch. Then the countdown mode is selected from the electrical countdown circuit by pressing the at least one switch. The countdown mode is selected from the group consisting of: a demonstration mode, a thirty minute timer mode, a sixty minute timer mode, a ninety minute timer mode, and an off mode. Finally, a terminate mode switch signal is received from the at least one switch.

In a further aspect of the invention, a timer device includes a countdown processor programmed to countdown from defined intervals of time. At least one switch is in communication with the countdown processor. The at least one switch is adapted to provide mode section information to the countdown processor. A speaker is in communication with the countdown processor. The speaker is adapted to produce a desired audio signal. A display device is in communication with the countdown processor. The display device includes an LCD display and one or more LED lights capable of flashing. A memory device is in communication with the countdown processor. The memory device is capable of storing program information, mode information, audio information, and timing information.

Additional aspects, advantages and other novel features of this invention will be set forth in part in the description that follows and in part will become apparent to those skilled in the art upon examination of the following or may be learned with the practice of the invention. The objects and advantages of this invention may be realized and attained by means of the instrumentalities and combinations particularly pointed out in the appended claims. Still other objects of the present invention will become readily apparent to those skilled in the art from the following description wherein there is shown and described several preferred embodiments of this invention, simply by way of illustration of modes of the invention suited to carry out this invention. As it will be realized, this invention is capable of other different embodiments, and its several details, steps, and specific features are capable of modification in various aspects without departing from the invention. Accordingly, the objects, drawings and descriptions should be regarded as illustrative in nature and not as restrictive.

BRIEF DESCRIPTION OF THE DRAWINGS

The accompanying drawings incorporated in and forming a part of the specification, illustrate one or more preferred embodiments of the present invention. Some although not all, alternative embodiments are also described in the following description. In the drawings.

DETAILED DESCRIPTION

Figures 1A, 1B, 1C:
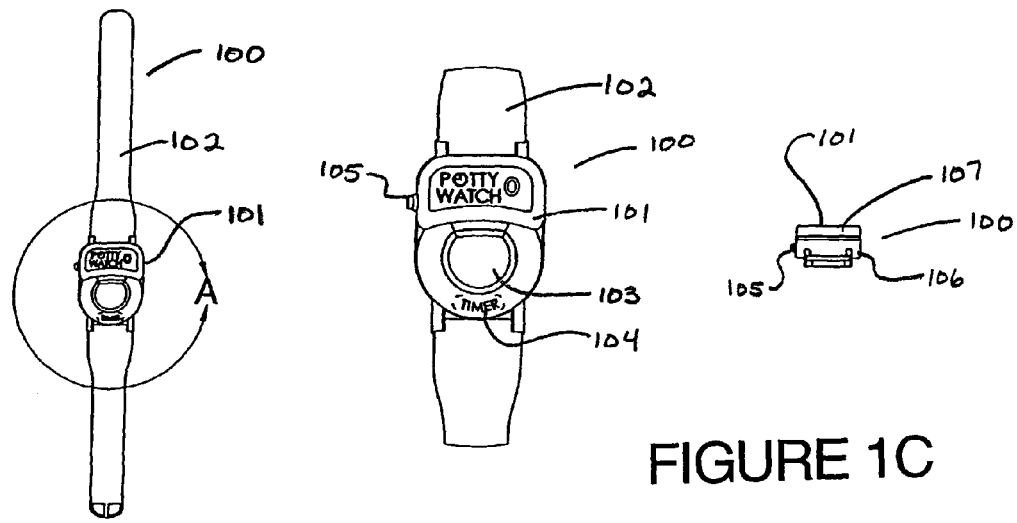
FIGS. 1A, B, C, D, and E are illustrations of the exterior of the present toilet trainer watch of the present embodiment of this invention.

Reference will now be made in detail to the present preferred embodiment of this invention, an example of which is illustrated in the accompanying drawings.

This invention is a timer device that can be used to help toilet train children. In the various embodiments, the invention includes an adjustable digital countdown timer with a musical and visual signal to indicate the end of the countdown interval and an automatic reset to the predetermined countdown interval. This device is adapted specifically for use as a reminder generator to remind the user to perform repetitive tasks. For example, it is particularly useful in toilet training young children. This invention can be used to help anyone perform a task that needs to be repeated at regular intervals. Other examples of use include, but are not limited to, providing a reminder to a person whose job includes making periodic rounds, such as a nurse or a security guard; providing a reminder to a person who should take medication and/or perform certain medical tests, for example a diabetic patient, at periodic intervals, or for a pet owner to housetrain a pet.

The provided alarm sounds, lights, and the shape of the present embodiment of this invention are designed to appeal to young children. For instance, the timer is described using flashing lights and easily recognized children's songs to remind the child at equally spaced intervals that it is time to try to use the toilet. But other alternative sounds and lights can be used for other specific uses and can be substituted without departing from the concept of this invention. After counting down the predetermined interval, this invention is designed to automatically reset itself to start counting down again, without input or adjustment from the user.

In addition to being programmable for various time intervals, this invention can be set to play the music and/or provide the visual stimuli e.g., (flashing lights) such as when the user pushes a particular button on the device. This capability is provided for use in a demonstration or "try me" mode, in which limited functions are displayed in order to convey the general purpose of the timer while on display on retail shelves or by a sales person, or as a reward for a successful completion of the desired task (such as using the toilet, making rounds, administrating a drug or the like). The invention also has an off mode which deactivates the timer function when the alarm is no longer desired. The off mode can be used, for example, during nap time, evening hours when the user needs to sleep or when the repetitive tasks for which reminders are being generated are completed for the day. In it's current embodiment, selecting the off mode returns the unit to the "try me" or demonstration mode. However, in other embodiments of this invention, the off mode could deactivate the entire unit until one or more specific buttons are pushed to restore power to the unit.

One of the most difficult parts of toilet training a young child is to remember to return the child to the toilet at regular intervals to keep the child interested and to encourage the child to succeed at the toilet task before an "accident" occurs. Similarly, it is difficult for a diabetic person learn to manage his or her disease by teaching the person to test his or her blood and to administer insulin at regular intervals and to thereby assist in blood sugar control. Because of the repetitive nature of these processes and myriad of other tasks demanded of the caregiver of such a young child, without the assistance of a preprogrammable device, the intervals can easily become random and lengthy. This device helps the child and caregiver by automatically reminding the child to perform the required task at the desired interval by using an alarm, beep, song, music or recorded voices, combined with a light display, or other visual or audio stimuli. The present embodiment of this invention is adapted to be worn on a wristband, however, other embodiments of the invention could be secured to a pocket or other clothing by means of a pin, clip, strap, band, belt, hook, buckle or hook and loop fastener, or hung around the neck of the user. Alternative embodiments of the invention could include a device to mount the timer to the wall, toilet seat, or otherwise placed in the proximity of the user or a room.

Figure 1D:
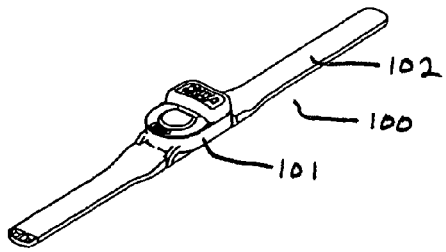
Figure 1E:
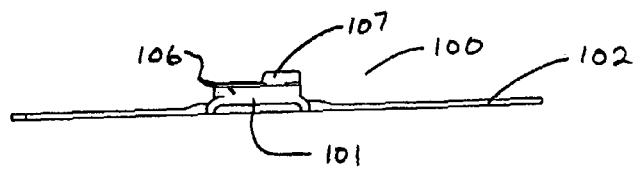

FIGS. 1A-E show illustrations of the exterior of the present toilet trainer of the present embodiment of this invention. FIG. 1A shows a top-down view of the present embodiment of this invention, including a timer device 100 that can include a wristband 102 attached to the timer body 101. The timer body 101 has an outer housing with an interior compartment for the countdown timer circuit. FIG. 1B shows a close-up view of the present timer body 101 attached to a wristband 102. FIG. 1B, shows the current orientation and locations of a first button 104 such as a "T" or "TIMER" button and a second button 105, such as an "S" or "SET" button, as well as the display 103 on the timer body housing 101. FIG. 1C shows an end view of the timer body housing 101 of the timer device 100 not attached to a wristband 102. FIG. 1C shows a lower portion of the timer body housing 106, that holds a display, processing and memory components, and the upper portion of the timer body housing 107, that holds a power source, such as a battery, batteries, or the like, and speaker components. FIG. 1D shows a perspective view of the present embodiment of the timer device 100 with the timer body 101 attached to a wristband 102. FIG. 1E shows a side view of the present embodiment of the timer device 100, with the timer body housing 101 attached to a wristband 102, which shows the lower portion of the timer body housing 106 and the upper portion of the timer body housing 107, which together houses the electrical components of the timer device. The lower portion 106 of the timer device is attached to the upper portion 107 by a fastening device such as screws, clips, clamp adhesive or the like. FIG. 1E shows the present embodiment of this invention is adapted to be worn on a wristband 102, however, other embodiments of the invention could be secured to a pocket or other clothing by means of a pin, clip, strap, band, hook, buckle or hook and loop fastener, or hung around the neck of the user. Alternative embodiments of the invention could include a device to mount the timer to the wall, toilet seat, or otherwise placed in the proximity of the user or room.

Figure 2:
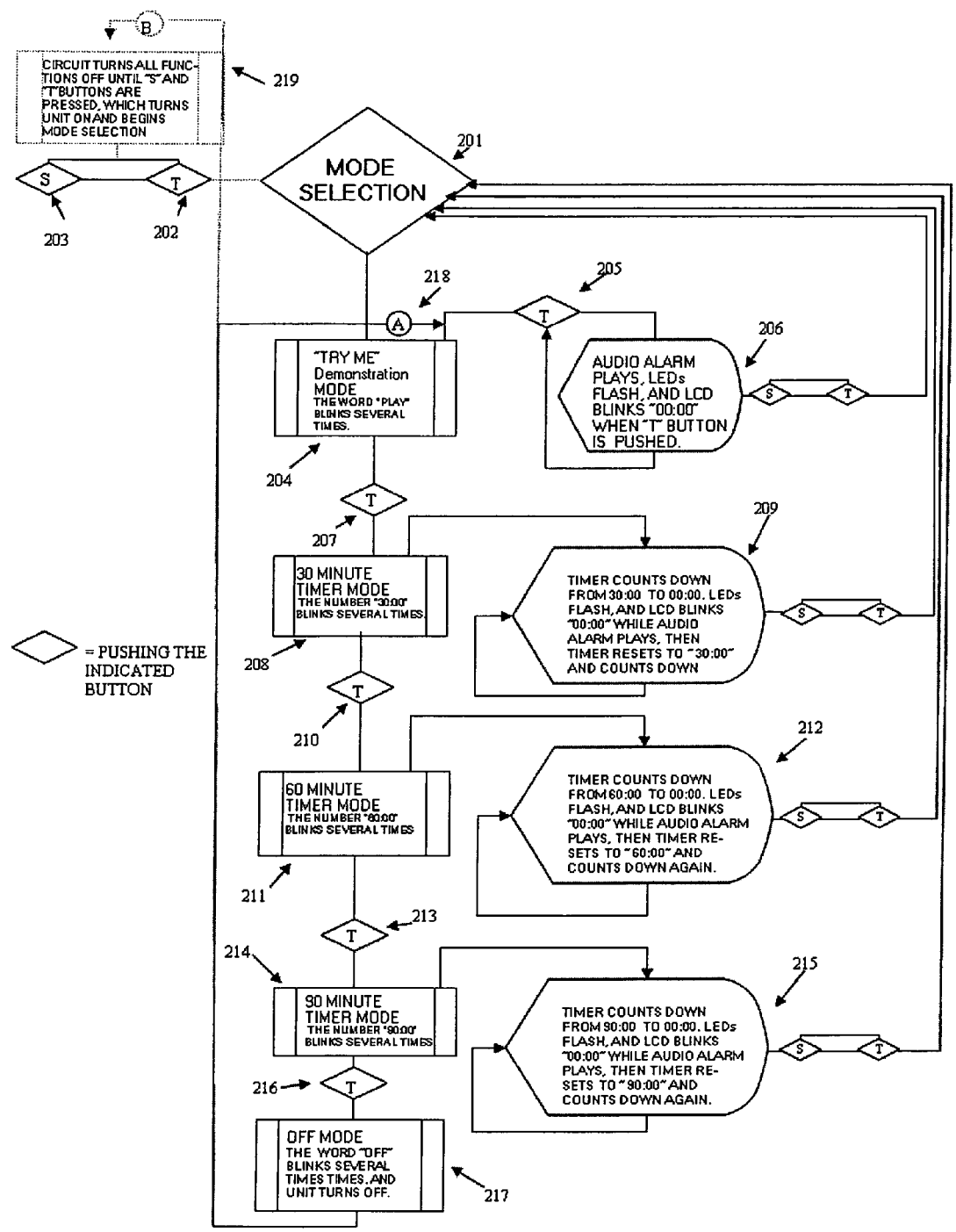
FIG. 2 is a detailed view of the steps of the programmed timer function of the present embodiment of this invention.

FIG. 2 shows a detailed view of the steps of the programmed timer function of the present embodiment of the invention. Mode selection 201 is entered by the user presently by pressing the "S" button 203 and the "T" button 202 together at or near simultaneously, typically one button may be pushed before the other at the same time so long as they are both pushed together. A "Try Me" mode 204 is provided which displays word "PLAY" which blinks several times. In the present embodiment, if the "T" button is pressed while the display is the flashing "PLAY," the timer advances to the next mode.

If the "T" button is not pressed within the time period that the word "play" is flashing, the "Try Me" demonstration mode is entered. Then, if the user presses the "T" button 205, a sample alarm is provided 206. Presently, the sample alarm 206 is that an audio alarm is played, display lights (typically LEDs) are flashed and the number "00:00" blinks on the provided LCD of the display 103. In the current embodiment of the timer device, the audio alarm is a digitally recorded song or tune, however alternative audio alarms could include a beep, digitally or analog recorded music or voice recording or other audio signal.

Alternatively, if in the 204 "Try Me Mode" the "T" button 207 is pressed while the word "PLAY" is still blinking, the "30 Minute Timer Mode" 208 is entered, and the number "30:00" blinks several times. If the "T" button 210 is not pressed within the "30 Minute Timer Mode" 208 while the number "30:00" is still blinking, the 30 minute timer count down 209 begins, with the timer counting down from thirty minutes (30:00). When the countdown reaches "00:00" minutes, an audio alarm is played, while lights, presently LED's, flash and the LCD screen blinks "00:00" after which, the timer is automatically reset to thirty minutes (30:00) and begins to count down again.

If the "T" button 210 is pressed within the "30 Minute Timer Mode" while the number "30:00" is still blinking, the timer advances to the next mode, the "60 Minute Timer Mode" 211 and the number "60:00" blinks on the display several times. If the "T" button 213 is not pressed while the number "60:00" is still blinking, timer count down 212 begins, with the timer counting down from sixty minutes (60:00). When the countdown reaches "00:00" minutes, the audio alarm is played, while lights, presently LED's, flashing and the LCD screen blinks "00:00," after which, the timer is automatically reset to sixty minutes (60:00) and begins to count down again.

Alternatively, if the "T" button 213 is pressed within the "60 Minute Timer Mode" 211 while the number "60:00" is still blinking, the timer advances to the next mode, the "90 Minute Timer Mode" 214. If the "T" button 216 is not pressed within the while the number "90:00" is blinking, the 90 minute timer count 215 down begins, with the timer counting down from ninety minutes (90:00). When the countdown timer reaches "00:00" minutes, the audio alarm is played while lights, presently LED's, flash and the LCD display blinks "00:00" after which, the timer is automatically reset to ninety minutes (90:00) and begins to count down again.

If the "T" button 216 is pressed within the "90 Minute Timer Mode" 215 five-second period, the timer advances to the next mode, the "Off Mode" 217. When the "Off Mode" 217 is entered the word "OFF" is displayed and blinks several times, after which the LCD screen goes blank. In the present embodiment of the timer device, when the "OFF MODE" is completed 218, the unit returns to the "TRY ME" demonstration cycle 206. In alternative embodiments of the timer device, the completion of the "OFF MODE" cycle 219 causes all functions on the timer device to cease and the unit to go dormant until the unit is turned on again (e.g. by pushing the "S" button 203 and the "T" button 202 at or near simultaneously in order to turn the timer device on and begin the mode selection 201).

Each of the countdown modes, 206, 209, 212, and 215 can be terminated by pressing both the "S" button and the "T" button simultaneously or near simultaneously; which will return the unit to the Mode Selection mode (201).

Figure 3:
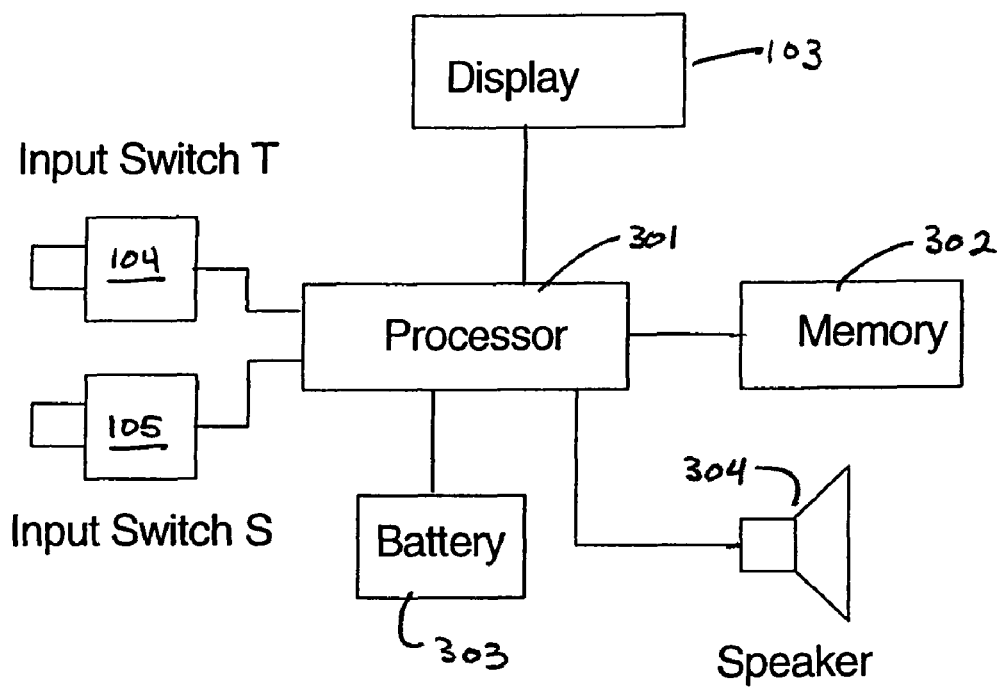
FIG. 3 is a detailed block diagram of the electronic components of the present embodiment of this invention.

FIG. 3 shows a detailed block diagram of the electronic components of the present embodiment of this invention. A processor 301 performing the countdown function and processing inputs from the switches, or "T" button 104 and "S" button 105 is provided. The present processor 301 is a custom designed integrated circuit adapted specifically to perform the functions of the timer. However, alternative processors 301 could be programmable or standard off-the-shelf discrete components programmed or configured to perform timer functions for variable time intervals of any duration. In the present embodiment, the input switches, or "T" button 104 and "S" button 105 can be standard "watch-style" push button switches, which are electronically connected to the processor. Alternative switches could be mechanical, membrane or electronic switches, and may include line filter, amplifying and signal bounce control circuitry. The processor 301 is also in electronic communication with a display device 103 for visually presenting the Mode Indication and, in the present embodiment the display device 103 includes both an LCD display and LEDs that are capable of flashing. A speaker 304 is in electronic communication with the processor 301 to facilitate the playing of an audio alarm such as a digitally recorded song or tune, beep, digitally or analog recorded music or voice recording or other audio signal.

A memory device 302 is electronically connected to the processor 301 for storage of the timer program, the sound; the display files and the like. Typically, the present memory device 302 is a random access and/or programmable read-only memory circuit. A battery 303 is provided to power the processor 301 and the other components 103, 302 of the timer device 100. In alternative embodiments of this invention the battery could be replaced with an A/C power cord or other alternative power source.

In the present invention, the timer device 100 uses the two buttons 104, 105, to set a predetermined cycle of time for the digital countdown timer, which when counted-down to 00:00 plays an audio alarm, for example, music such as "Are You Sleeping Brother John," "Oh, My Darlin° Clementine," or "London Bridges Falling Down," can be played back. An LED light display an eye catching pattern can be combined with the audio alarm. One present version of the timer of this invention is a wristwatch-sized timer that resembles a com-mode that is designed to fit the wrist of a child.

In its current configuration, the timer device 100 is set by using the two buttons 104, 105. The "Set" (or "S") button 105 on the side of the timer body 101 and the "Timer" (or "T") button 104 on the top of the timer body 101. When both the "T" button 104 and the "S" button 105 are pressed at or about the same time, the timer device 100 goes into "Mode Selection" mode 201, which provides the user the capability to set up the circuitry (as shown in FIG. 3) of the timer device 100, into the desired mode.

In the "Try Me" mode, the digitally stored word "PLAY" is displayed on the Liquid Crystal Display (LCD) of the Display 103 and can blink several times. If the "T" button 104 is not pressed again during the period that the word "PLAY" is blinking, the timer device 100 goes into the "Try Me" mode 206. In this mode, the LCD on the display 103 will be dormant until the "T" button 104 is pressed, at which time the timer device 100 will play the sample alarm, which consists of playing the audio alarm, through the speaker 304 and the LEDs on the display 103 will flash and the LCD on the display 103 will blink "00:00" while the audio alarm is played. After the audio alarm is played, the timer will go dormant, until the "T" button 104 is pressed again, at which time the timer device 100 will repeat the sample alarm. Alternatively, if both the "S" button 105 and the "T" button 104 are pressed at or about the same time, the circuit will send the timer device 100 back to the MODE SELECTION mode 201, with the word "PLAY" blinking several times on the LCD of the display 103.

Pressing the "T" button again while the word "PLAY" is blinking directs the circuit to put the timer device 100 into the next mode, which is the "Thirty Minute Timer" mode 208. In this mode, the LCD on the display 103 will display "30:00" which will blink several times. If the "T" button 104 is not pressed within the time limit, the timer device 100 will begin counting down thirty minutes from 29:59 to 00:00 at which time the audio alarm will be played through the speaker 304, the LCD of the Display 103 will blink 00:00 and the LED lights on the Display 103 will flash. When the audio alarm is finished playing, the timer device 100 is automatically reset to 30:00 and the countdown process is repeated until both the "S" button 105 and the "T" button 104 are pressed at or about the same time, which terminates the countdown sequence and returns the timer device 100 to the "Mode Selection" mode 201.

If, while the LCD of the display 103 is blinking "30:00," the "T" button 104 is pressed, then the timer will go forward to the "Sixty Minute Timer" mode 211 and the numbers "60:00" will blink several times on the LCD of the Display 103. If the "T" button 104 is not pressed during the time limit, the timer device 100 will countdown from 59:59 to 00:00 at which time the audio alarm will play while the LED of the Display 103, flash the LCD on the display 103 will blink "00:00." When the audio alarm is finished, then the timer device 100 automatically starts counting down from 59:59 and the countdown process is repeated until both the "T" button 104 and the "S" button 105 are pressed at or near simultaneously, which terminates the countdown sequence and returns the timer device 100 to the "Mode Selection" mode 201.

If, while the LCD of the display 103 is blinking "60:00" the "T" button 104 is pressed again, then the timer device 100 will go forward into the "Ninety Minute Timer Mode" 214 with the numbers 90:00 blinking for several seconds, if the "T" button 104 is not pressed within the time limit, the timer device 100 will start counting down form 89:59 to 00:00, play audio alarm from the speaker 304 and display 103 will show the flashing LED lights and the LCD for the Display 103 will blink "00:00" until the audio alarm is finished, at which time the circuit will automatically reset the timer device 100 to 90:00 and the countdown process is repeated until both the "T" button 104 and "S" button 105 are pressed at or near simultaneously, which terminates the countdown sequence and returns the timer device 100 to the "Mode Selection" mode 201.

If, while the LCD of the display 103 is blinking "90:00," the "T" button 104 is pressed, the timer device 100 will proceed to the "Off" mode. In the current embodiment of the timer device, in the "OFF" mode the digitally stored word "OFF" blinks several times on the LCD of the display 103, at which time the circuit returns the timer device 100 to the "TRY ME" mode cycle 206 as shown in the letter A inside a circle 218 on FIG. 2.

In alternative embodiments of the invention, in the "OFF Mode" the word "OFF" will blink several times, at which time the timer device 100 will turn off all functions and remain dormant until both the "T" button 104 and the "S" button 105 are are pressed at or near simultaneously, which will turn the timer device 100 on and start the "Mode Selection" mode 201 as shown by the dashed line and the letter B inside the circle 219 on FIG. 2.

In alternative embodiments of this timer device, the amount of time desired in the programmed intervals is selectable by the user to any time period. In these alternative embodiments, the pre-set 30, 60, 90-minute modes as well as additional preset countdown modes may be provided and/or the user may be given an option of selecting a user-defined mode. In a user-defined mode, the user can select a desired countdown interval from any reasonable number of minutes.

In a further embodiment of this timer device 100, a 5 minute "reward" period can be added to the preprogrammed or user defined timer intervals. The 5 minute reward period will follow the audio alarm and the Flashing LEDs signal the end of the selected countdown time interval. During this 5 minute "reward" period, the audio alarm will play, through the speaker 304 and the LEDs of the display 103 will flash and the numbers "00:00" will flash on the LCD of the display 103 whenever the Timer Button 104 is pushed in order to entertain the child while he or she is on the toilet. After the 5 minute "reward" period is over, the timer device 100 will automatically reset to the preprogrammed or user defined timer interval and begin to count down automatically and repeat the selected timer sequence and reward period until both the T button 104 and the S button 105 are pressed at the same time, which will return the unit to the Mode selection mode, as in the current embodiment of the timer device 100.

It is to be understood that the above described embodiments and examples are merely illustrative of numerous and varied other embodiments and applications which may constitute applications of the principles of the invention. These example embodiments are not intended to be exhaustive or to limit the invention to the precise form, connection or choice of components, computer language or modules disclosed herein as the present preferred embodiments. Obvious modifications or variations are possible and foreseeable in light of the above teachings. These embodiments of the invention were chosen and described to provide the best illustration of the principles of the invention and its practical application to thereby enable one of ordinary skill in the art to make and use the invention, without undue experimentation. Other embodiments may be readily devised by those skilled in the art without departing from the spirit or scope of this invention and it is our intent that they be deemed to be within the scope of this invention, as determined by the appended claims when they are interpreted in accordance with the breadth to which they are fairly, legally and equitably entitled.

What is claimed is:

1. A toilet training device for children, comprising:
   a timer housing;
   an electronic countdown circuit that counts down from a pre-selected timing interval disposed within the timer housing, the electronic countdown circuit automatically restarting the countdown to the pre-selected timing interval after completion of the pre-selected timing interval, wherein the pre-selected timing interval corresponds to a desired period of time between attempts to use a toilet by a child,
   a display device attached to the timer housing and in electronic communication with the electronic countdown circuit; and
   a first switch and a second switch in electrical communication with the electronic countdown circuit, the first switch and second switch operating the electronic countdown circuit, wherein, during the countdown from the pre-selected timing interval, the first switch and the second switch are each inoperable except when pressed simultaneously to end the countdown from the pre-selected timing interval.

2. The toilet training device as recited in claim 1, wherein the pre-selected timing interval is one of an automatically repeating thirty minute interval, an automatically repeating sixty minute interval, and an automatically repeating ninety minute interval.

3. The toilet training device as recited in claim 1, wherein the electrical countdown circuit is adapted to provide an adjustable selection of the pre-selected timing interval.

4. The toilet training device as recited in claim 1, wherein the electronic countdown circuit is programmed to toggle the mode of countdown when one of the first and second switches is pressed within a predetermined time limit after the first and second switches are pressed together.

5. The toilet training device as recited in claim 1, further comprising an attachment device connected to the timer housing, the attachment device being configured to secure the timer device to a user.

6. The toilet training device as recited in claim 5, wherein the attachment device consists of at least one of a wrist band, pin, clip, strap, band, belt, hook, buckle, and hook and loop fastener.

7. The toilet training device as recited in claim 1, further comprising a speaker disposed in the timer housing and in electrical communication with the electronic countdown circuit.

8. The toilet training device as recited in claim 7, wherein the electronic countdown circuit is programmed to play an audio signal that corresponds to the mode of countdown operation.

9. The toilet training device as recited in claim 7, wherein the timer housing includes a raised portion that is configured to contain the speaker, wherein the raised portion resembles the tank of a toilet, and wherein the display is contained in a portion of the timer housing resembling the bowl of a toilet.

10. The toilet training device as recited in claim 1, wherein the display device is configured to display a reward display at about the completion of the pre-selected time interval.

11. A method of toilet training a child, comprising:
providing a timer device with an electronic countdown circuit and a first switch and a second switch in electrical communication with the electronic countdown circuit, the electronic countdown circuit being programmed with a pre-selected time interval corresponding to a desired interval of time between toilet use attempts by the child being toilet trained;
pressing the first and second switches simultaneously by an individual other than the child being toilet trained;
receiving a selection switch signal in the electronic countdown circuit from the simultaneous pressing of the first switch and the second switch;
selecting the countdown mode from the electrical countdown circuit by pressing the first switch, the countdown mode being selected from the group including at least two of:
a demonstration mode,
a thirty minute timer mode,
a sixty minute timer mode, and
a ninety minute timer mode;
counting down the pre-selected time interval corresponding to the selected countdown mode; and
automatically restarting the counting down to the pre-selected timing interval corresponding to the selected countdown mode, each of the first and second switch being inoperable during the counting down to the pre-selected timing interval except when pressed simultaneously to stop the counting down.

12. The method as recited in claim 11, further comprising providing a reward period before the counting down is automatically restarted.

13. The method as recited in claim 12, wherein providing a reward period further comprises playing an audio signal.

14. The method as recited in claim 11, further comprising playing an audio signal when the counting down is completed.

15. The method as recited in claim 11, further comprising flashing an LED light when the counting down is completed.

16. The method as recited in claim 11, wherein selecting the countdown mode further comprises toggling the countdown mode between at least two of the demonstration mode, the thirty minute timer mode, the sixty minute timer mode, and the ninety minute timer mode.

17. The method as recited in claim 11, wherein selecting the countdown mode further comprises playing an audio signal in the demonstration mode when the at least one switch is pressed.

18. A toilet training device, comprising:
a body having the general appearance of a toilet having a bowl portion and a tank portion and configured to be worn by a child being toilet trained;
a display disposed in the bowl portion;
a speaker disposed in the tank portion;
batteries disposed in the tank portion;
a first button being located adjacent to the display;
a second button located on a side of the body, the buttons being arranged such that it is difficult for a child to press both buttons simultaneously while wearing the device; and
electronic circuitry that automatically counts down and automatically repeats the countdown to a pre-selected time interval associated with a period of time between attempts by the child to use a toilet, wherein the time interval is interruptable and selectable only when the first and second buttons are pressed simultaneously, the first and second buttons being inoperable during the countdown except when pressed simultaneously, and wherein the electronic circuitry provides reward signals to the display and the speaker at the end of the countdown, the display signals providing a reward to the child to encourage an attempt to use a toilet.

* * * * *

US007885146C1

(12) EX PARTE REEXAMINATION CERTIFICATE (9788th)
United States Patent
Parkinson et al.

(10) Number: US 7,885,146 C1
(45) Certificate Issued: Aug. 6, 2013

(54) ADJUSTABLE COUNT DOWN TIMER

(75) Inventors: Alan Parkinson, Sandy, UT (US);
Pamela Parkinson, Sandy, UT (US);
Katie Cochran, Bountiful, UT (US)

(73) Assignee: Iverson Imports, Inc., Sandy, UT (US)

Reexamination Request:
No. 90/012,346, Jun. 12, 2012

Reexamination Certificate for:
Patent No.: 7,885,146
Issued: Feb. 8, 2011
Appl. No.: 11/511,899
Filed: Aug. 28, 2006

Related U.S. Application Data

(60) Provisional application No. 60/713,188, filed on Aug. 31, 2005.

(51) Int. Cl.
*G04F 10/00* (2006.01)
*G04B 47/00* (2006.01)

(52) U.S. Cl.
USPC .......................... 368/109; 368/10; 340/309.4

(58) Field of Classification Search
None
See application file for complete search history.

(56) References Cited

To view the complete listing of prior art documents cited during the proceeding for Reexamination Control Number 90/012,346, please refer to the USPTO's public Patent Application Information Retrieval (PAIR) system under the Display References tab.

*Primary Examiner* — Nick Corsaro

(57) ABSTRACT

A timer device includes a timer housing. An electronic countdown circuit is disposed within the timer housing. The electronic countdown circuit is programmed to include at least one mode of operation. A display device is attached to the timer housing and in electronic communication with the electronic countdown circuit. The display device includes an LCD display and at least one flashable LED light. A power source is in electrical communication with the electronic circuit. At least one switch is in electrical communication with the electronic countdown circuit. The switch is adapted to select the mode of countdown operation.

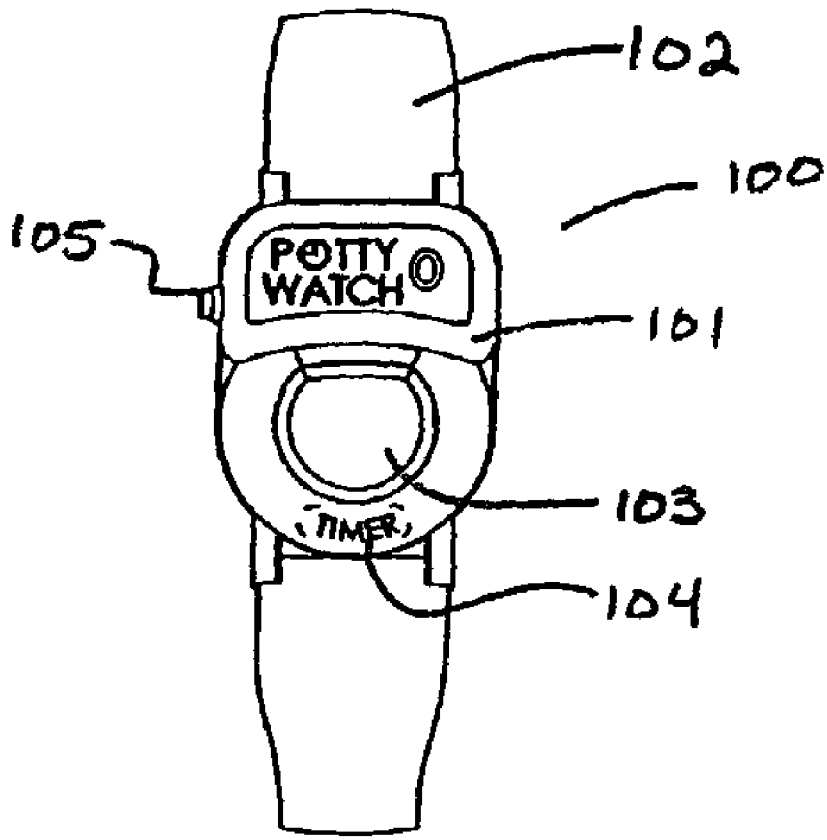

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11-16 is confirmed.

Claim 4 is cancelled.

Claim 1 is determined to be patentable as amended.

Claims 2, 3, 5-8 and 10, dependent on an amended claim, are determined to be patentable.

Claims 9, 17 and 18 were not reexamined.

1. A toilet training device for children, comprising:
a timer housing;
an electronic countdown circuit that counts down from a pre-selected timing interval disposed within the timer housing, the electronic countdown circuit automatically restarting the countdown to the pre-selected timing interval after completion of the pre-selected timing interval, wherein the pre-selected timing interval corresponds to a desired period of time between attempts to use a toilet by a child, a display device attached to the timer housing and in electronic communication with the electronic countdown circuit; and a first switch and a second switch in electrical communication with the electronic countdown circuit, the first switch and second switch operating the electronic countdown circuit, wherein, during the countdown from the pre-selected timing interval, the first switch and the second switch are each inoperable except when pressed simultaneously to end the countdown from the pre-selected timing interval, *and wherein the electronic countdown circuit is programmed to toggle the mode of countdown when one of the first and second switches is pressed within a predetermined time limit after the first and second switches are pressed together.*

\* \* \* \* \*